(12) United States Patent
Kim et al.

(10) Patent No.: US 7,882,534 B2
(45) Date of Patent: *Feb. 1, 2011

(54) VIRTUAL CHANNEL TABLE FOR A BROADCAST PROTOCOL AND METHOD OF BROADCASTING AND RECEIVING BROADCAST SIGNALS USING THE SAME

(75) Inventors: Jin Pil Kim, Seoul (KR); C. Gomer Thomas, Piscataway, NJ (US)

(73) Assignee: LG Electronics Inc., Seoul (KR)

( * ) Notice: Subject to any disclaimer, the term of this patent is extended or adjusted under 35 U.S.C. 154(b) by 33 days.

This patent is subject to a terminal disclaimer.

(21) Appl. No.: 12/461,920

(22) Filed: Aug. 27, 2009

(65) Prior Publication Data

US 2009/0322965 A1    Dec. 31, 2009

Related U.S. Application Data

(63) Continuation of application No. 11/980,724, filed on Oct. 31, 2007, now Pat. No. 7,603,695, which is a continuation of application No. 11/088,941, filed on Mar. 25, 2005, now Pat. No. 7,469,415, which is a continuation of application No. 09/684,389, filed on Oct. 10, 2000, now Pat. No. 7,051,361.

(30) Foreign Application Priority Data

Oct. 8, 1999    (KR) .................................. 99-43508

(51) Int. Cl.
*H04N 7/16* (2006.01)
(52) U.S. Cl. ...................................... 725/144; 725/151

(58) Field of Classification Search ........................ None
See application file for complete search history.

(56) References Cited

U.S. PATENT DOCUMENTS

| | | | |
|---|---|---|---|
| 5,894,320 | A | 4/1999 | Vancelette |
| 5,982,411 | A | 11/1999 | Eyer et al. |
| 6,133,910 | A | 10/2000 | Stinebruner |

(Continued)

FOREIGN PATENT DOCUMENTS

JP        11234648        8/1999

(Continued)

OTHER PUBLICATIONS

"ATSC Standard: Program and System Information Protocol for TErrestrial Broadcast and Cable", Advanced Television Systems Committee, Doc A/65, Dec. 23, 1997.*

(Continued)

*Primary Examiner*—Andrew Y Koenig
*Assistant Examiner*—Jasmine Stokely-Collins
(74) *Attorney, Agent, or Firm*—McKenna Long & Aldridge LLP

(57) ABSTRACT

A virtual channel table for broadcasting protocol and a method for broadcasting by using the virtual channel table includes identification information identifying and permitting discrimination of active and inactive channels contained in the virtual channel table. At a receiver, the virtual channel table transmitted from the transmitting side is parsed, thereby determining whether the current received channel is an active or inactive channel.

14 Claims, 8 Drawing Sheets

U.S. PATENT DOCUMENTS

| | | | |
|---|---|---|---|
| 6,137,539 | A | 10/2000 | Lownes et al. |
| 6,369,861 | B1 | 4/2002 | Lownes |
| 6,483,547 | B1 | 11/2002 | Eyer |
| 6,661,472 | B2 | 12/2003 | Shintani et al. |
| 6,763,522 | B1 | 7/2004 | Kondo et al. |
| 6,775,843 | B1 | 8/2004 | McDermott |
| 6,792,616 | B1 | 9/2004 | Jerding et al. |
| 7,017,177 | B1 | 3/2006 | Funakoshi |
| 2002/0035726 | A1 | 3/2002 | Corl |
| 2003/0133050 | A1 | 7/2003 | Shintani et al. |
| 2004/0225846 | A1 | 11/2004 | Guo |
| 2004/0261117 | A1 | 12/2004 | Kuh |

FOREIGN PATENT DOCUMENTS

| | | |
|---|---|---|
| TW | 358311 | 5/1999 |
| WO | WO 99/03268 | 1/1999 |
| WO | WO 99/03269 | 1/1999 |

OTHER PUBLICATIONS

"ATSC Standard: Program and System Information Protocol for Terrestrial Broadcast and Cable (Revision B)," Advanced Television Systems Committee, Doc. A/65B, Mar. 18, 2003.

"System Information for Digital Television ATSC Standard," Advanced Television Systems Committee, Doc, A/56, Jan. 3, 1993.

* cited by examiner

| Syntax | Bits | Format |
|---|---|---|
| terrestrial_virtual_channel_table_section () { | | |
|   table_id | 8 | 0xC8 |
|   section_syntax_indicator | 1 | '1' |
|   private_indicator | 1 | '1' |
|   zero | 2 | '00' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for(i=0; i<num_channels_in_section;i++) { | | |
|     short_name | 7*16 | unicode™ BMP |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 6 | '111111' |
|     service_type | 6 | uimsbf |
|     source_id | 16 | uimsbf |
|     reserved | 6 | '111111' |
|     descriptors_length | 10 | uimsbf |
|     for (i=0;i<N;i++) { | | |
|       descriptors() | | |
|     } | | |
|   } | | |
|   reserved | 6 | '111111' |
|   additional_descriptors_length | 10 | uimsbf |
|   for(j=0; j<N;j++) { | | |
|     additional_descriptors() | | |
|   } | | |
|   CRC_32 | 32 | rpchof |
| } | | |

FIGURE 1

| Syntax | Bits | Format |
|---|---|---|
| terrestrial_virtual_channel_table_section () { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0; i<num_channels_in_section;i++) { | | |
|         short_name | 7*16 | unicode™BMP |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i=0;i<N;i++) { | | |
|             descriptors() | | |
|         } | | |
|     } | | |
|     reserved | 6 | '111111' |
|     additional_descriptors_length | 10 | uimsbf |
|     for(j=0; j<N;j++) { | | |
|         additional_descriptors() | | |
|     } | | |
|     CRC_32 | 32 | rpchof |
| } | | |

FIGURE 3

| Syntax | Bits | Format |
|---|---|---|
| cable_virtual_channel_table_section () { | | |
|     table_id | 8 | 0xC9 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0; i<num_channels_in_section;i++) { | | |
|         short_name | 7*16 | unicode™BMP |
|         reserved | 4 | '1111' |
|         major_channel_number | 10 | uimsbf |
|         minor_channel_number | 10 | uimsbf |
|         modulation mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         path_select | 1 | bslbf |
|         out_of_band | 1 | bslbf |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i=0;i<N;i++) { | | |
|             descriptors() | | |
|         } | | |
|     } | | |
|     reserved | 6 | '111111' |
|     additional_descriptors_length | 10 | uimsbf |
|     for(j=0; j<N;j++) { | | |
|         additional_descriptors() | | |
|     } | | |
|     CRC_32 | 32 | rpchof |
| } | | |

FIGURE 4

| Descriptor Name | Descriptor tag | Terrestrial | | | | Cable | | |
|---|---|---|---|---|---|---|---|---|
| | | PMT | MGT | VCT | EIT | PMT | MGT | VCT |
| stuffing descriptor | 0x80 | • | • | • | • | • | • | • |
| AC-3 audio descriptor | 0x81 | • | | | • | • | | |
| program identifier descriptor | 0x85 | • | | | | • | | |
| caption service descriptor | 0x86 | • | | | • | • | | |
| content advisory descriptor | 0x87 | • | | | • | • | | |
| extended channel name descriptor | 0xA0 | | | • | | | | • |
| service location descriptor | 0xA1 | | | • | | | | |
| time-shifted service descriptor | 0xA2 | | | • | | | | • |
| component name descriptor | 0xA3 | | | | | • | | |
| user private | 0xC0-0xFF | | • | • | • | | • | • |

FIGURE 5

VIRTUAL CHANNEL TABLE FOR A BROADCAST PROTOCOL AND METHOD OF BROADCASTING AND RECEIVING BROADCAST SIGNALS USING THE SAME

This application is a Continuation of application Ser. Nos. 11/980,724 filed on Oct. 31, 2007, now U.S. Pat. No. 7,603,695 Ser. No. 11/088,941 filed on Mar. 25, 2005, now U.S. Pat. No. 7,469,415 Ser. No. 09/684,389 filed on Oct. 10, 2000 now U.S. Pat. No. 7,051,361, which claims the benefit of Korean Patent Application No. 1999-43508 filed in Korea on Oct. 8, 1999, all of which are hereby incorporated by reference.

BACKGROUND OF THE INVENTION

1. Field of the Invention

The present invention relates to a virtual channel table for a broadcast protocol and a method of broadcasting using the same.

2. Discussion of the Related Art

Generally, a program and system information protocol (hereinafter, referred to as PSIP) of an Advanced Television Systems Committee (hereinafter, referred to as ATSC) standard for digital television broadcasting contains a virtual channel table (VCT). "Program and System Information Protocol For Terrestrial Broadcast and Cable," ATSC Document A/65, 23 Dec. 1997, is hereby incorporated by reference for all purposes as if fully set forth herein.

The PSIP typically also contains an electronic program guide (EPG) and system information (SI). The PSIP is defined as the protocol of the ATSC standard for terrestrial and cable digital television broadcasting which parses encoded messages by using a moving picture experts group-2 (MPEG-2; ISO/IEC 13818-1) system to thereby provide various kinds of information on the broadcast programs (Lee ATSC document A/65, 23 Dec. 1997).

In other words, the PSIP transmits and receives audio/video data with MPEG-2 video and AC-3 audio formats, and contains several tables for transmitting information on the channel of each broadcasting station, and information on the programs on each channel. The PSIP has a primary function of conducting the audio and video services of the broadcast corresponding to a desired channel, and an additional function of conducting the electronic program service for the broadcast programs.

The channel information for the channel selection and the packet identification (PID) information for reception of the audio and video data are contained in the virtual channel table (VCT), and the electronic program service information on the broadcast programs on each channel is contained in an event information table (EIT). Also, the PSIP contains a system time table (STT) for time information, a rating region table (RRT) for transmitting information on the region and organization for program rating, an extended text table (ETT) for providing an additional explanation on the channel and broadcast program, and a master guide table (MGT) for management of the version of each table mentioned above and the packet identification (PID). These tables are transmitted in data units, which are called sections. Namely, all of the tables have one or more sections as a basic unit.

By way of example, the virtual channel table may be divided into 256 sections. A single section may contain information on several virtual channels, but information for a single virtual channel may not be spread over on two or more sections.

FIG. 1 is a diagram illustrating the bit stream syntax of a general virtual channel table for terrestrial broadcast, which has been described in the above-mentioned ATSC document A/65. The general virtual channel table contains a transport stream identifier, a major channel number, a minor channel number, a short channel name, a carrier frequency, a program number and the like, and contains additional information in the descriptor(s) thereof.

Referring to FIG. 1, the virtual channel table has the table identifier field of "0xC8," and the value of the packet identification (PID) for the virtual channel table is "0x1FFB." The version number field "version_number" represents the version value of the virtual channel table, the section number field "section_number" represents a corresponding section number, the last section number field "last_section_number" represents a last section number of the virtual channel table, and the section number channel field "num_channels_in_section" represents the number of whole virtual channels existing within the sections of the virtual channel table.

The short name field "short_name" within the statement in the "for_loop" represents the name of the virtual channel, and the major channel number field "major_channel_number" represents a major channel number among the virtual channels defined in the statement mentioned above. Each virtual channel number is connected to the major and minor channel numbers, respectively, and the major and minor channel numbers function as the user reference number for the corresponding virtual channel. In other words, the virtual channel table carries the data for each virtual channel through the statement of the "for_loop."

The program number field "program_number" contains the information for connecting the virtual channel where the MPEG-2 program association table (PAT) and program map table (PMT) are defined, which corresponds to the program numbers in the program association table and the program map table. In this case, the program association table defines the components of the program every program number, namely, indicates the packet identification of the transport packet transmitting the program map table. The program map table defines the list and the annex information thereof on the packet identification of the transport packet transmitting the program identification number and the bit stream of the video and audio signals constituting the program.

The source identifier field "source_id" represents the program source connected to the corresponding virtual channel. In this case, the source means a specific source such as image, text, data or sound. The source identifier field "source_id" has a unique value in the transport stream transmitting the virtual channel table. The descriptor length field "descriptors length" indicates the whole length of the descriptors of the corresponding virtual channel, and the additional descriptor length field "additional descriptors length" indicates the whole length of all of the additional descriptors of the virtual channel table.

FIG. 5 shows an exemplary list of descriptors for PSIP tables according to the ATSC standard.

FIG. 2 is a diagram illustrating an example of executing scheduled broadcasting by using four virtual channels in a broadcasting station.

By way of example, it is assumed that the scheduled broadcast as shown in FIG. 2 is executed through the four virtual channels, 51-1, 51-2, 51-3 and 51-8 in an arbitrary broadcast station and a virtual channel table composed of a single section is transmitted.

If the current time is 20:15, the system time table transmits the current time information. In this case, the channels 51-1 and 51-3 which are broadcasting at the current time (20:15) are defined as the "active channels."

On the other hand, the channel 51-2 is not broadcasting at the current time and is going to be broadcast the next day, and the channel 51-8 is going to be broadcast next at 06:00. In this case, the channels 51-2 and 51-8, which are not broadcasting at the current time (20:15) and are going to be broadcast in the future, are defined as the "inactive channels."

As a result, each channel may be an active or inactive channel, based upon an arbitrary point in time.

Within the PSIP, the virtual channel table should contain the active channels as required by the standard, and may also contain the inactive channels as recommended by the standard, for conducting the electronic program guide service.

Therefore, at the current time (20:15) the virtual channel table may contain information on all of the channels 51-1, 51-2, 51-3 and 51-8, and thus a digital television broadcast receiver or a digital cable broadcast receiver receives the virtual channel table to thereby provide the channel selection information to TV viewers.

However, as shown in FIG. 1, according to the bit stream syntax of the virtual channel table according to the ATSC document A/65, the digital television broadcast receiver or the digital cable broadcast receiver cannot discriminate between the active channels (for example, the channels 51-1 and 51-3) and the inactive channels (for example, the channels 51-2 and 51-8), when parsing the virtual channel table.

As a consequence, the TV viewers see a black screen because of the information on the inactive channels transmitted from the broadcast station for providing the electronic program guide. The black screen means the black background color is displayed on the screen when an inactive channel not broadcasting at a current time is selected. On the other hand, the character message "service not provided" is displayed on the screen of the black background color by the on-screen display function of the digital television broadcast receiver or the digital cable broadcast receiver. By way of example, if the TV viewer selects the channel 51-2 with a channel up key while viewing the channel 51-1, the audio and video data are not displayed because the channel 51-2 is an inactive channel, such that the black background color is displayed on the screen.

The above-mentioned problem may give many inconvenience to the TV viewers at a point of time when digital television broadcast receivers or digital cable broadcast receivers become popular and a large number of virtual channels are broadcast.

SUMMARY OF THE INVENTION

Accordingly, the present invention is directed to a virtual channel table that substantially obviates one or more of the problems due to limitations and disadvantages of the related art.

An object of the present invention is to provide a virtual channel table for a broadcast protocol, and a method of broadcasting by using the same table, which are capable of identifying and permitting discrimination between active and inactive channels from the channels received by a broadcast receiver.

Another object of the invention is to provide a virtual channel table for a broadcast protocol, and a method of broadcasting by using the same table, which are capable of rapidly displaying only the channels being broadcast at a current time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to an aspect of the present invention, there is provided a virtual channel table for a broadcast protocol which comprises identification information capable of identifying and permitting discrimination between active and inactive channels in the bit stream syntax thereof.

The identification information may be loaded on or included in at least one reserved field in the virtual channel table. Preferably, the identification information assigns at least one or more bits of a reserved field as a flag, thereby indicating that a corresponding channel is an inactive channel.

For example, the value of the program number field "program_number" in the virtual channel table is set to "0," thereby indicating that the corresponding channel is the inactive channel.

The identification information sets the value of the number elements field "number_elements" of the service position descriptor field "service_location_descriptor" in the virtual channel table to "0," thereby indicating that the corresponding channel is an inactive channel.

In a case where the corresponding channel is an inactive channel, the virtual channel table does not contain the service location descriptor field therein, for the purpose of indicating that the corresponding channel is an inactive channel.

According to another aspect of the present invention, there is provided a method for broadcasting by using a virtual channel table for a broadcasting protocol, which comprises the steps of: including identification information capable of identifying and permitting discrimination between active and inactive channels in the bit stream syntax of the virtual channel table for a broadcasting protocol and transmitting the virtual channel table, at a transmitting side; and, at a receiving side, determining whether the channel currently received is an active channel or an inactive channel with the identification information defined in the virtual channel table by parsing the virtual channel table transmitted.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a diagram illustrating the bit stream syntax of a general virtual channel table for terrestrial broadcast;

FIG. 3 is a diagram illustrating the bit stream syntax of a virtual channel table for terrestrial broadcast according to an embodiment of the present invention;

FIG. 4 is a diagram illustrating the bit stream syntax of a virtual channel table for cable according to another embodiment of the present invention;

FIG. 5 is chart listing various descriptors available according to a program and system information protocol of an advanced television systems committee standard digital television broadcast;

DETAILED DESCRIPTION OF THE PREFERRED EMBODIMENTS

Figure 2:
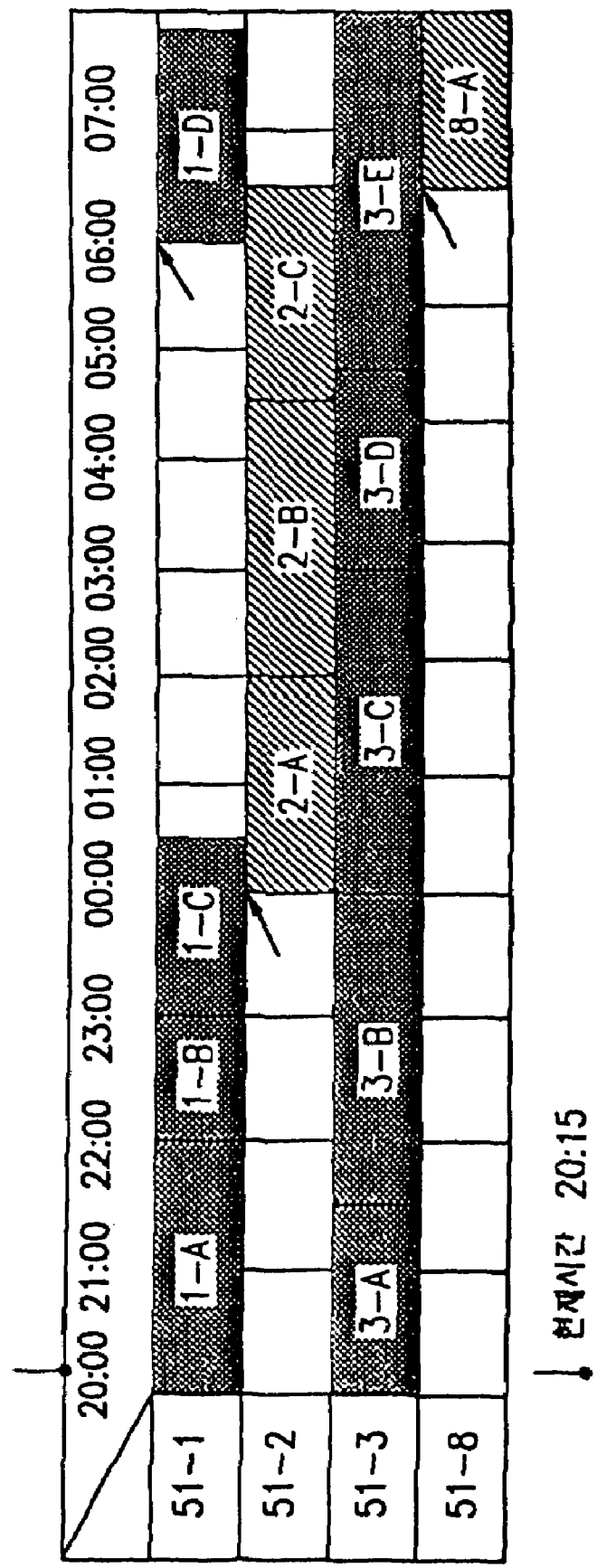
FIG. 2 is a diagram illustrating an example of executing schedule broadcasting by using four virtual channels in a broadcast station.

Reference will now be made in detail to the preferred embodiments of the present invention, examples of which is illustrated in the accompanying drawings.

According to the present invention, a virtual channel table for a broadcast protocol comprises identification information capable of identifying and permitting discrimination between active and inactive channels in the bit stream syntax thereof. A transmitting side, namely, a broadcast station transmits the virtual channel table having the identification information to receivers. Each of receivers parses the virtual channel table received, thereby determining whether the channel currently selected is an active channel or an inactive channel.

The identification information, which is capable of identifying and permitting discrimination between an active channel and an inactive channel under the standard of the PSIP, is contained in at least one field of the virtual channel table of the above protocol, such that only active channels being currently broadcast are displayed to TV viewers.

Hereinafter, preferred embodiments of a virtual channel table and a method according to the present invention will be in detail described with reference to FIGS. 3 and 4.

In order for a digital television receiver and a digital cable broadcast receiver to parse the virtual channel table and thus to determine whether the channel selected currently is an active channel or an inactive channel, the bit stream syntax of the virtual channel table may be corrected.

For example, the fact that channels 51-2 and 51-8 are not broadcast at the current time 20:15, but are going to be broadcast in the future, should be recognized in a digital television receiver and a cable broadcast receiver. In a preferred embodiment, the identification information capable of identifying an inactive channel is contained in the program number field "program_number," the service location descriptor field "service_location_descriptor" and/or other reserved fields contained in the bit stream syntax of the virtual channel table.

FIG. 3 is a diagram illustrating the bit stream syntax of a virtual channel table for terrestrial broadcast according to an embodiment of the present invention. To indicate that a corresponding channel is an inactive channel, the value of the program number field "program number" is set to "0". And, since there are no audio and video signals of the current service location descriptor, the value of the number elements field "number_elements" of the service location descriptor "service_location descriptor" is set to "0". Also, or alternatively, to indicate that the corresponding channel is an inactive channel, the service location descriptor "service_location_descriptor" (see FIG. 5) is not contained in the virtual channel table. In other words, the digital television receiver and the cable broadcast receiver, the service location descriptor field should be contained in the virtual channel table only in a case where the corresponding channel is the active channel. If the corresponding channel is an inactive channel, however, the service location descriptor field is not contained in the virtual channel table.

In a preferred embodiment, in order to recognize the fact that the corresponding channel is an inactive channel in a more apparent manner, 1 bit of the reserved field of 6 bits for each channel is assigned to define a flag indicative of an inactive channel. In the preferred embodiment, 1 bit in the reserved field between the hidden field "hidden" and the service type field "service_type" in the statement of the "for_loop" is assigned to define a flag indicative of an inactive channel. For example, in a case where the flag indicative of the inactive channel is "1," the corresponding channel is an active channel, and if the flag is "0," the corresponding channel is an inactive channel.

In the preferred embodiment, the above three cases may be added as requirements in the document A/65. Any of all of the three cases may be added in the document A/65.

As mentioned above, since the information on an inactive channel is contained in the virtual channel table, the digital television receiver can determine whether the virtual channel currently received is an active channel or an inactive channel by parsing only the virtual channel table. For example, if the value of the program number field "program_number" in the virtual channel table is "0," if the value of the information on the inactive channel defined by assigning a predetermined bit in the reserved field is "0," or if the service location descriptor field "service_location_descriptor" is not contained in the virtual channel table, the major channel number field "major_channel_number" and the minor channel number field "minor_channel_number" defined in the bit stream syntax of the virtual channel table currently transmitted determine that the current virtual channel is an inactive channel.

On the other hand, if an inactive channel has been determined under the above process, the digital television receiver can skip the inactive channel, without displaying it on the screen, upon channel conversion by means of a channel up key or a channel down key.

FIG. 4 is a diagram illustrating the bit stream syntax of a virtual channel table for cable according to another embodiment. As shown, the virtual channel table may be applied to cable broadcasting in the same manner as above.

Figure 6:
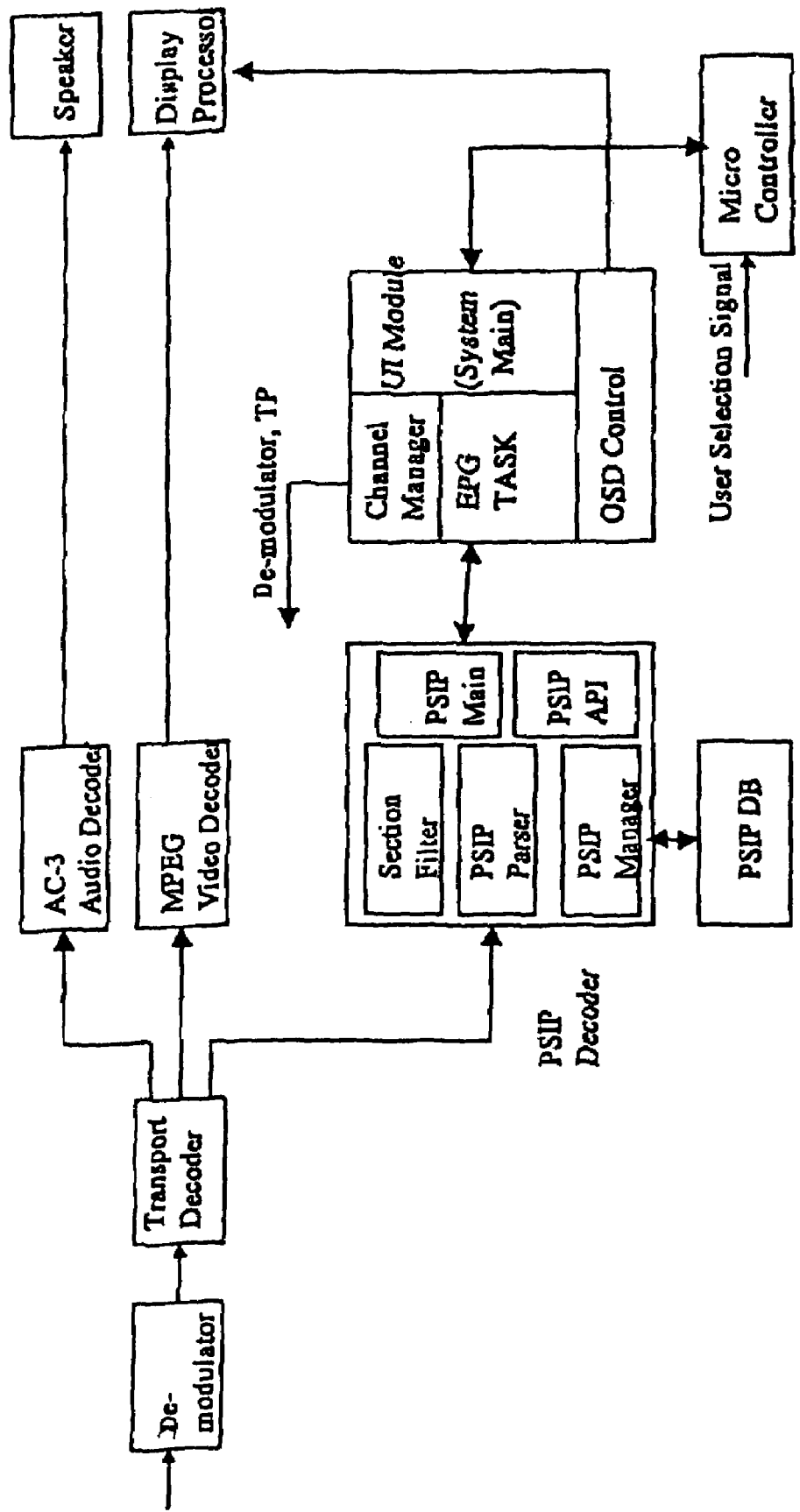
FIG. 6 is block diagram illustrating a digital television (DTV) receiver according to an embodiment of the present invention.

FIG. 6 shows a block diagram of a preferred embodiment of a digital television (DTV) receiver. A demodulator converts an RF signal to a baseband signal after channel error collection. Then, a transport decoder separates several signals, such as audio, video, PSIP, etc. and outputs the audio and video streams to audio and video decoders, and a PSIP data stream to a PSIP decoder. The PSIP Decoder decodes the PSIP data stream for storing PSIP data in a PSIP database, and provides output to a user interface (UI) module for showing an active program or an EPG display.

Now, the PSIP decoder will be explained. A PSIP parser parses PSIP tables (VCT,EIT,STT,RRT,ETT,MGT) and the result is output to PSIP main section. One can distinguish between active and inactive channels by the parsing result. A section filter separates a necessary section from the PSIP data that was output by the transport decoder and outputs the necessary data to the PSIP Parser.

A PSIP manager controls the PSIP database (DB). The PSIP Main section controls the transport decoder for receiving tables of PSIP data The PSEP Application Program Interface (API) provides an output to allow an external module to access PSIP DB. The Channel Manager and EPG Task components are operated by user selection signal of the channel key and/or EPG Key. If the user selects the channel key, the channel manager outputs the channel changing signal to the demodulator and transport decoder. In this case, a user can see an active channel. If the user selects the EPG key, the EPG Task component controls the PSIP Decoder to support an EPG display Mode. In this case, a user can see both active and inactive channels, displayed in an EPG screen.

Figure 7:
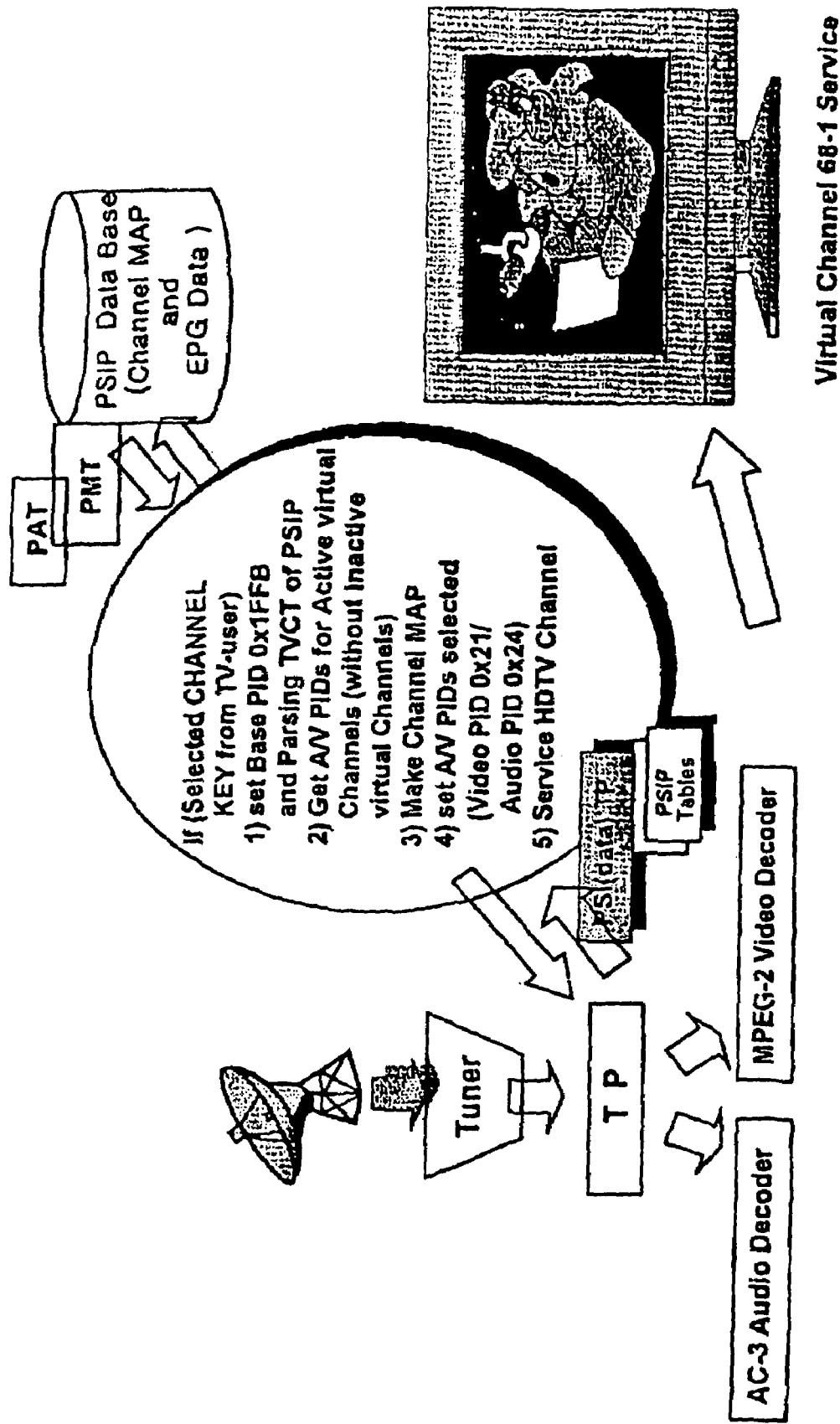
FIG. 7 is a diagram illustrating a preferred embodiment process of handling active and inactive channels for display in response to a user selection key.

FIG. 7 shows channel surfing by using of the PSIP according to an embodiment of the present invention. At first, a channel is selected by a TV-user. And the transport decoder prepares to receive many signals, such as audio, video and PSIP transport packets. Next, the PSIP Decoder sets a PID value of (0x1FFB) into the transport decoder to select the terrestrial virtual channel table (TVCT) of the PSIP, and gets the audio and video (A/V) PD values for the active virtual channels. (Inactive virtual channels don't have A/V PID values, but have channel information for the EPG Service.) Then, the PSIP Decoder makes a channel map for the PSIP, sends it to the channel manager, to be used for tuning active channels. The n, the channel manager sets A/V PIDs (Video PID 0x21, Audio PID 0x24) for virtual channel number(68-1) selected by the TV-user. The transport decoder receives the A/V transport packets, sends them to the A/V decoder(s), and finally the DTV channel will be serviced.

Figure 8:
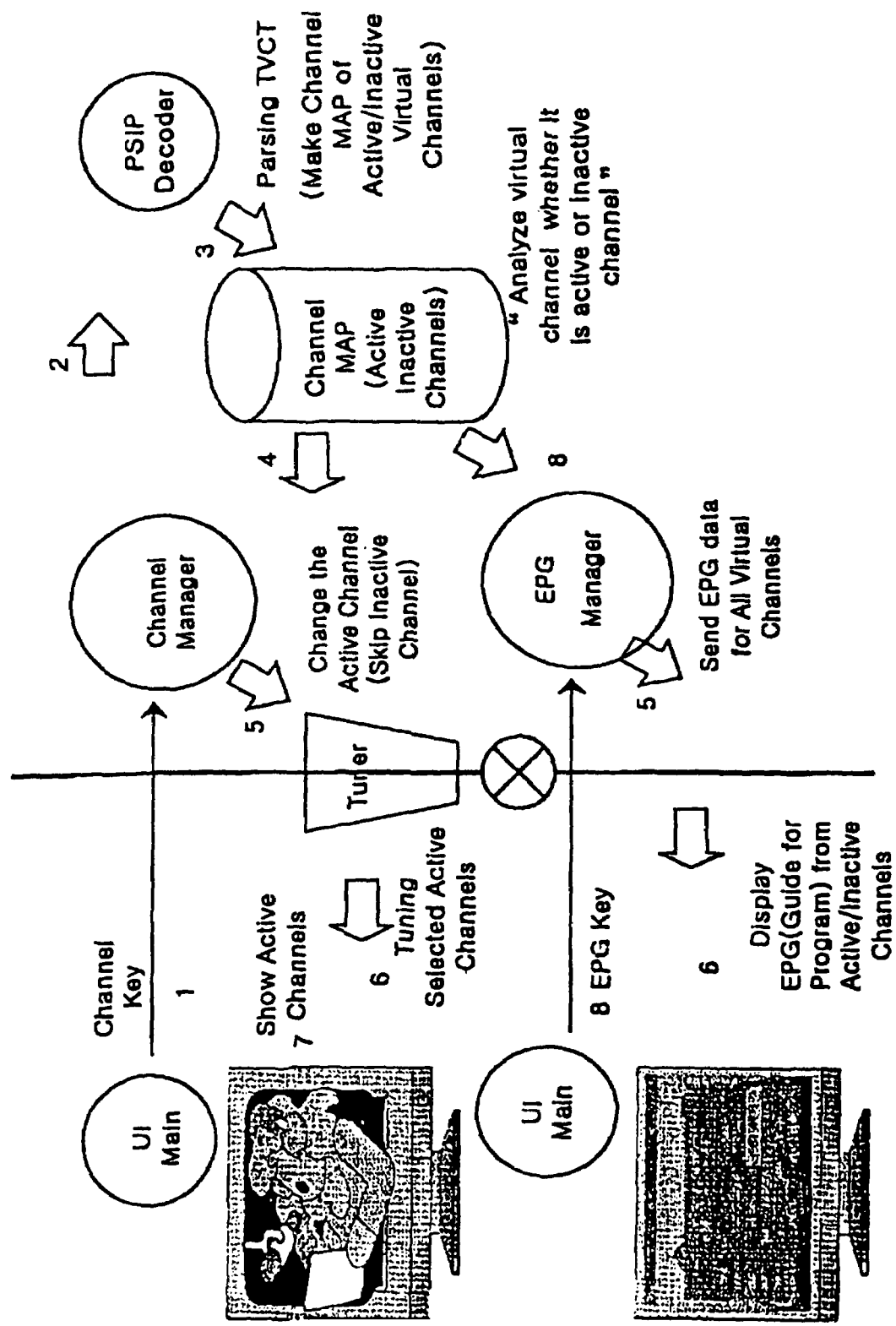
FIG. 8 is a flowchart illustrating a preferred embodiment process of producing a display of a program or an electronic program guide (EPG) according to a channel or EPG selection key input by a user.

FIG. 8 shows a flowchart illustrating channel tuning and EPG Display. The user can see only the active channels displayed when tuning channels, but when the user receives the EPG Service, he/she sees an EPG display which includes all of the virtual channels, including the inactive channels.

As is apparent from the foregoing description, a virtual channel table for a broadcast protocol, and a method of broadcasting by using the virtual channel table are capable of including the identification information capable of identifying and permitting discrimination between active and inactive channels in a transmitting side, and in a receiving side parsing the virtual channel table to thereby determine whether the channel currently selected is the active channel or the inactive channel. Therefore, inactive channels may be skipped, without being displayed, upon the channel conversion by using a channel up key or a channel down key, such that the TV viewer can enjoy channel surfing in a convenient manner, without viewing a black screen. In addition, the virtual channel table may be transmitted, while containing the inactive channels therein, thereby making it possible to provide a more abundant electronic program service.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of identifying a status of a broadcast service in a digital broadcast receiver, the method comprising:
   receiving a digital broadcast signal including service status information;
   detecting the service status information from the digital broadcast signal, the service status information indicating whether the broadcast service is an active or an inactive service; and
   controlling display of the broadcast service when the broadcast service is determined to be inactive and is selected by a user,
   wherein the inactive service is a broadcast service that is not presently broadcasted but is scheduled to be broadcasted at a predetermined later time from a broadcast station without local viewer interaction.

2. The method of claim 1, wherein the active service is a broadcast service that is presently broadcasted from a broadcast station.

3. The method of claim 1, wherein controlling display of the broadcast service comprises automatically skipping the broadcast service when the broadcast service is determined to be inactive and is selected by the user.

4. The method of claim 1, wherein the service status information comprises an information bit which indicates whether the broadcast service is active or an inactive service.

5. The method of claim 1, wherein the service status information further indicates whether the broadcast service is hidden or not.

6. The method of claim 5, wherein the service status information comprises first and second information bits, the first information bit indicating whether the broadcast service is an active or an inactive service, the second information bit indicating whether the broadcast service is hidden or not.

7. The method of claim 1, wherein the service status information is included in a predetermined data field.

8. A digital broadcast receiver for identifying a status of a broadcast service, the digital broadcast receiver comprising:
   a receiving unit for receiving a digital broadcast signal including service status information;
   a detector for detecting the service status information from the digital broadcast signal, the service status information indicating whether the broadcast service is an active or an inactive service; and
   a controller for controlling display of the broadcast service when the broadcast service is determined to be inactive and is selected by a user,
   wherein the inactive service is a broadcast service that is not presently broadcasted but is scheduled to be broadcasted at a predetermined later time from a broadcast station without local viewer interaction.

9. The digital broadcast receiver of claim 8, wherein the active service is a broadcast service that is presently broadcasted from a broadcast station.

10. The digital broadcast receiver of claim 8, wherein controlling display of the broadcast service comprises automatically skipping the broadcast service when the broadcast service is determined to be inactive and is selected by the user.

11. The digital broadcast receiver of claim 8, wherein the service status information comprises an information bit which indicates whether the broadcast service is active or an inactive service.

12. The digital broadcast receiver of claim 8, wherein the service status information further indicates whether the broadcast service is hidden or not.

13. The digital broadcast receiver of claim 12, wherein the service status information comprises first and second information bits, the first information bit indicating whether the broadcast service is an active or an inactive service, the second information bit indicating whether the broadcast service is hidden or not.

14. The digital broadcast receiver of claim 8, wherein the service status information is included in a predetermined data field.

* * * * *